Figure 1:
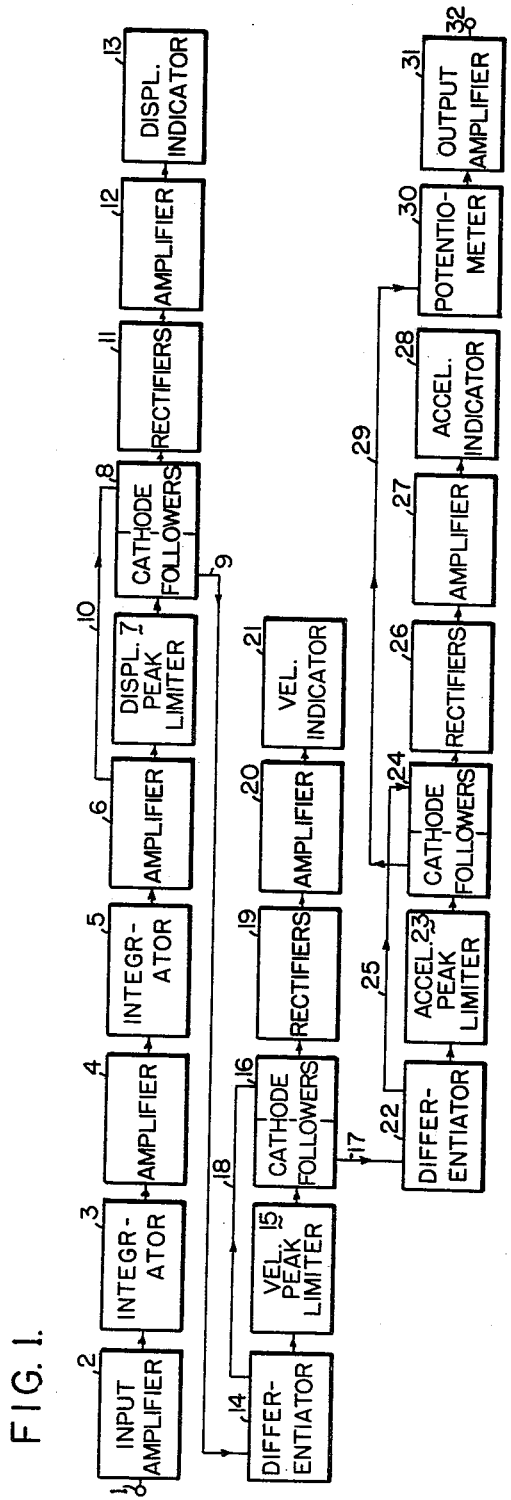

INVENTORS
JAMES A. ROSS
FRANCIS R. BARLETT
BY Harry R. Lubcke
AGENT

INVENTORS
JAMES A. ROSS
FRANCIS R. BARLETT
BY Harry R. Lubcke
AGENT

United States Patent Office 3,010,099
Patented Nov. 21, 1961

3,010,099
MULTIPLE LIMITER-CLIPPER AMPLIFIERS
James A. Ross, San Fernando, and Francis R. Barlett, Van Nuys, Calif., assignors to Ling-Temco-Vought, Inc., Dallas, Tex., a corporation of Delaware
Filed Apr. 11, 1957, Ser. No. 652,219
10 Claims. (Cl. 340—248)

Our invention relates to an electrical circuit for successively altering the character of an alternating current signal and for removing any amplitude thereof in excess of a given datum at any or all alterations thereof. More specifically it relates to a device having successive amplifier, integrator, peak limiter, differentiator and amplifier elements for limiting excessive displacements, velocities and/or accelerations from an alternating current signal proportional to acceleration and for indicating such limiting by clipper actuated indicators.

In vibration testing it is desirable to simulate subsequent operating conditions as closely as possible. While at times this may be achieved by sine wave testing, the use of a random noise generator or of a prerecorded complex wave is superior. For instance, the acceleration of an actual missile may be determined by means of instruments therein and telemeter apparatus for recording these determinations on the ground. Besides the acceleration signal there may be spurious variations which would cause disruptive amplitude displacements of the electrical to mechanical transducer ("shaker") of the vibration system.

It is customary to record such telemetered information on magnetic tape. Should imperfections of the tape or in the recording or reproducing processes occur (i.e. "dropouts"), relatively large displacement signals would be created. Similar displacement signals may also occur from a random noise generator or other means of simulation.

Without suitable protection against spurious displacement signals the shaker and specimen are in constant danger of damage. It is to remove such signals without necessarily altering the character of the acceleration signal that our invention was made.

Briefly, we accomplish our objective by successively operating upon the original acceleration signal by calculus-function elements interspersed between amplifier elements. The latter provide isolation for the several calculus functions. Specifically, the acceleration signal is imperfectly integrated to produce a velocity signal and again imperfectly integrated to produce a displacement signal. The latter signal is then peak limited so that the maximum excursions thereof are restrained within safe limits. The resulting signal is then imperfectly differentiated to produce a velocity signal, again peak limited, and then imperfectly differentiated again to produce an acceleration signal, which is also peak limited. The last acceleration signal has essentially the characteristics of the first, save for the omission of the abnormal displacement components.

We have found that the otherwise highly desirable displacement limiting process very often introduces spurious velocity and acceleration components in the reformed signal and thus velocity limiting of the reformed velocity signal is provided and acceleration limiting of the reformed acceleration signal is also provided. In this way all abnormalities are eliminated.

It is to be noted that limiting is accomplished by eliminating signal peaks and not by altering the whole waveshape as by means of a variable mu pentode vacuum tube. We are here interested in removing relatively unrelated signal peaks and not in altering the waveform of the normal signal amplitudes.

It is highly informative for the operator to know when displacement, velocity or acceleration peak limiting is occurring. Thus, the non-limited signal is compared with the bias of the limiting diodes, and by means of rectifiers, amplifiers and glow tube indicators the operator obtains a visual indication of peak limiting. This includes the information as to which side of the waveform is being limited. The indicating operation is accomplished by a clipping process.

Our device is automatic in operation, may be calibrated at reduced operating levels for safety and adjusted for desired limiting performance.

An object of our invention is to provide means for removing a component from an alternating signal having a spurious relation to the main character of that signal.

Another object is to remove abnormal variations of a lower calculus function from a signal representing a higher calculus function.

Another object is to provide means to remove abnormal amplitudes of an alternating current signal and to provide means to indicate when such removal is taking place.

Another object is to provide indicating means to indicate whether peak limiting is taking place from positive, negative or both peaks of the signal.

Another object is to protect an electromechanical vibration system from displacement overload regardless of displacement components in an acceleration driving signal.

Another object is to eliminate spurious velocity and/or acceleration signals from an acceleration signal from which displacement signals of overload amplitude have been removed.

Another object is to provide indicators of abnormal displacement, velocity and/or acceleration signals in an electrical system.

Another object is to provide an electronic device for successively altering the characteristic of a signal and for separately affecting each said characteristic.

Figure 2:
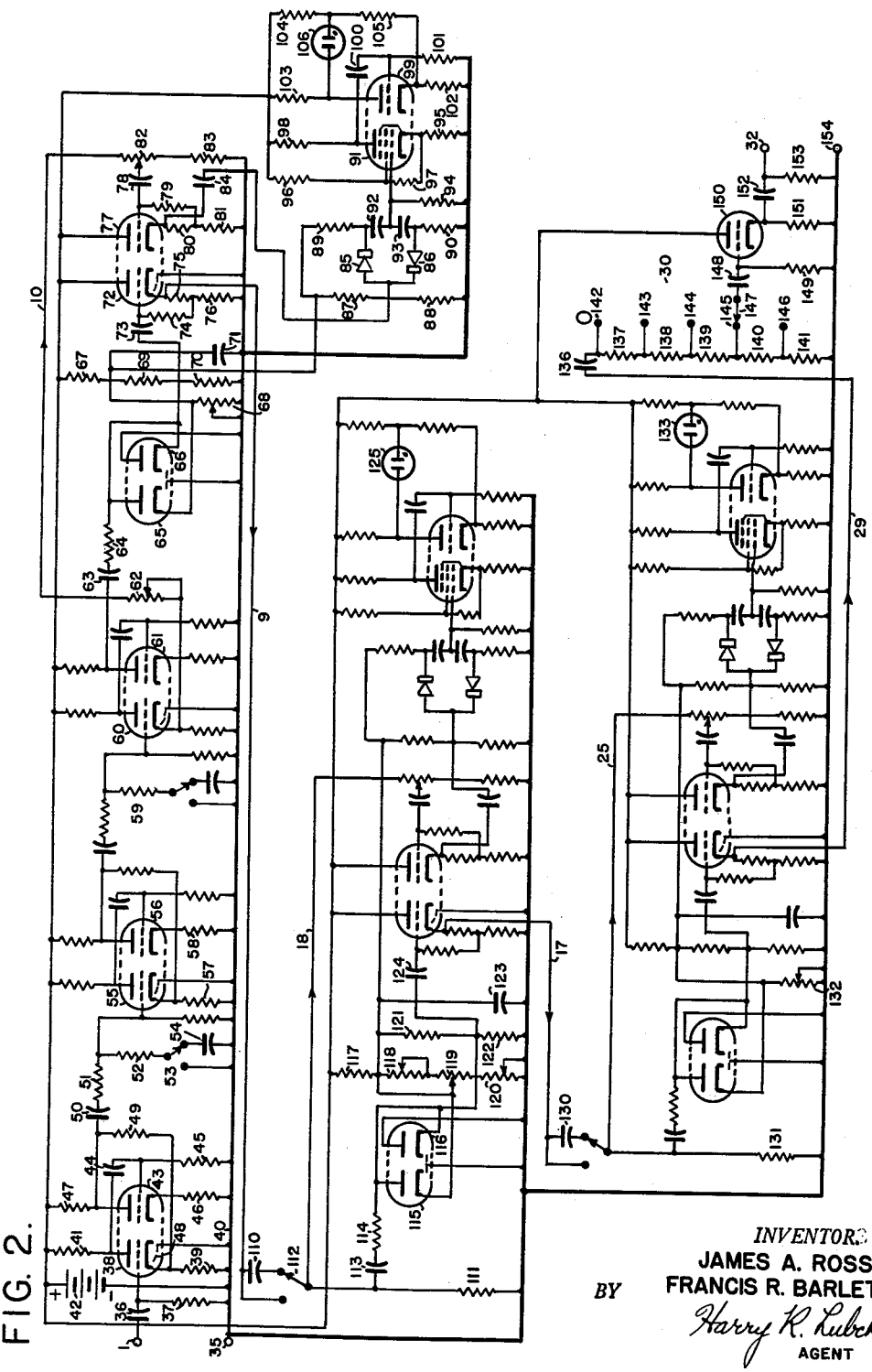

Other objects of our invention will become apparent upon reading the following detailed specification and upon examining the accompanying drawings, in which:

FIG. 1 shows a block diagram of our multiple limiter-clipper amplifier, and
FIG. 2 shows the schematic circuit diagram of the same.

In FIG. 1 numeral 1 is the input terminal to our device, to which the output of the random noise generator or the reproducing apparatus for the pre-recorded complex wave is connected. An input amplifier 2 isolates the (partial) integrator 3 from impedance variations due to the characteristics of the circuits to which it may be connected. Assuming that an acceleration signal is impressed upon the input, the output of integrator 3 is a velocity signal. Amplifier 4 isolates second integrator 5 from the first integrator 3. The output of integrator 5 is a displacement signal. Amplifier 6 is again for isolation. Each of these amplifiers are twin triode inverse feedback units in a typical embodiment. Because the integrators considerably attenuate the signal the amplifiers are required to also maintain the signal level substantially constant.

Displacement peak limiter 7 is a double diode connected to remove both positive and negative peaks beyond predetermined amplitudes. Rectangle 8 represents a pair of cathode follower triodes. One is connected to limiter 7 and provides a low impedance output via conductor 9 for the remainder of the circuit. The other is supplied with a non-limited signal from amplifier 6 via conductor 10 for comparison with the opposte biases in rectifiers 11. In the latter are found oppositely connected clipper diodes and signal-carrying resistors so connected as to allow a signal to pass only if limiting on either or both of the positive and negative peaks has occurred in limiter 7. Assuming this to have occurred the resulting waveform is considerably amplified by amplifier 12, which is comprised of a pentode and a triode vacuum tube. Connected thereto is indicator 13, characteristically comprised of a small neon bulb connected to the plate circuit of the triode of amplifier 12 and adjusted to flash when the clipped indicating signal is supplied to it. Indicator 13 indicates limiting of the displacement waveform. As shown, the several recited elements are connected in cascade, save for the branching circuit in the cathode followers 8 via conductor 9.

The second row of elements in FIG. 1 is concerned with the velocity aspect of the signal. It includes means for forming a velocity signal from the previously produced displacement signal and means for indicating if limiting occurs on the velocity waveform.

(Partial) differentiator 14 acts upon the displacement signal conveyed from the previously described elements via conductor 9 to alter that signal to a velocity signal. Velocity peak limiter 15 limits this signal, if required, by the same means and in the same manner as previous limiter 7. Cathode followers 16 are constituted and connected essentially the same as were those of 8. The output to the further circuit is conveyed via conductor 17. Conductor 18 conveys the non-limited signal for comparison with the biases in rectifiers 19. Rectifiers 19, amplifier 20 and indicator 21 are constituted and function essentially the same as the prior corresponding elements 11, 12 and 13.

In the third row of elements differentiator 22 increases the characteristic of the signal one order as a calculus function, this now becoming a reconstituted acceleration signal from which abnormal displacement and/or velocity amplitudes have been removed. Acceleration peak limiter 23, cathode followers 24, non-limited conveying conductor 25, rectifiers 26, amplifiers 27 and indicator 28 are all constituted, connected and function similarly to the corresponding elements before mentioned.

Via conductor 29 the reconstituted acceleration signal is impressed upon potentiometer 30. By adjustment thereof the vibration apparatus as a whole may be calibrated and otherwise checked without possible excessive vibration thereto or to the specimen which then need not be removed for calibrating adjustments.

Whatever the level of output from potentiometer 30 may be it is passed by cathode follower output amplifier 31, largely so that the output of our device may be at low impedance and unaffected by the nature of the following circuit to which it may be connected. The output terminal is 32.

Our device is described in greater detail in connection with the schematic circuit of FIG. 2. Terminal 1 is the signal input terminal as in FIG. 1, with terminal 35 constituting the common or signal ground terminal, which extends throughout our device. Capacitor 36 and resistor 37 constitute an input circuit having a time constant of the order of 1/10 second for triode 38, being connected to the grid thereof. The cathode thereof is connected to unbypassed cathode resistor 39 having a relatively high value of the order of 15,000 ohms, and thence to the common ground conductor 40. The plate of triode 38 is connected to plate resistor 41. This has a resistance of the order of 70,000 ohms. The other terminal of resistor 41 connects to the positive terminal of plate voltage supply battery 42, whcih has a voltage of the order of 250 volts.

A second triode 43 is connected to the plate of the first by means of capacitor 44 and grid return resistor 45, having a time constant of one second. The cathode of triode 43 is connected to self bias resistor 46 of 1,000 ohms resistance, while the plate thereof is connected through a plate resistor 47 of 50,000 ohms to plate supply 42. Triodes 38 and 43 may be housed in a common vacuum envelope, as the 6CG7 type of vacuum tube. An internal electrostatic shield 48 is preferably connected to ground as shown. Negative feedback resistor 49 of a quarter megohm resistance connects from the plate of the second triode 43 to the cathode of the first triode, 38. Since this amplifier is used to amplify frequencies as low as a few cycles per second the use of bypass capacitors across cathode bias resistors, etc. is more or less impractical, but we obtain proper and necessary functioning by the inclusion of negative (degenerative) feedback as has been explained.

Capacitor 50 is for coupling, being connected to the plate of triode 43 and having a capacitance of a half microfarad. Resistor 51 is an integrating resistor. It is connected to capacitor 50 and has a resistance of 100,000 ohms. Resistor 52 makes this integrator an imperfect or incomplete integrator, so that the higher frequencies of the incoming signal will not be fully attenuated. It is connected to resistor 51 and has a resistance of a few thousand ohms. Through two-position switch 53 resistor 52 may be connected to integrating capacitor 54 or directly to ground. Capacitor 54 has a capacitance of a half microfarad. When in the circuit it reduces the order of the mathematical function of the impressed acceleration signal to that of a velocity signal. When out of the circuit the integrating function is not performed at all. This is so that our device may be used to clip acceleration only, by means to be later described.

The junction between resistors 51 and 52 is connected to the control grid of triode 55. Triodes 55 and 56 and the accompanying resistor and capacitor elements comprise a second feedback amplifier substantially identical to that previously described encompassing elements 37 to 50. In this case, cathode bias resistors 57 and 58 have resistance values of the order of 2,000 ohms. Otherwise, not only is the circuit the same as before but the component values are also. This second amplifier is therefore not further described.

A second incomplete integrator is generally indicated by numeral 59. It is identical with the first incomplete integrator represented by numerals 51 to 54 and is connected to the output of amplifier 55—56. It reduces the order of the velocity signal to that of travel, or displacement, as understood in the well known terminology of physics.

The second integrator 59 is isolated as necessary by a third amplifier comprised of triodes 60—61 and associated components. This has the same connections and the same values of the components as amplifier 55—56, save that the feedback resistor 62 is variable, having a maximum value of 100,000 ohms and coupling capacitor 63 has a capacitance of 0.1 microfarad. Series resistor 64, connected thereto, has a value of the order of a quarter megohm and coacts with double diode 65—66 to limit abnormally large amplitudes, either positive or negative because of the inverse connection of the two.

Resistors 67 and 68 are connected in series from the plate supply voltage to ground. The former is fixed and of 30,000 ohms resistance while the latter is variable and has a maximum resistance of 10,000 ohms. Assume a typical adjustment of resistor 68 to place a potential of plus 10 volts at the junction of the two resistors and thus upon the cathode of diode 65. Resistors 69 and 70 are of equal value of the order of 2 megohms each. The potential of the junction of these two resistors is thus plus 5 volts, and so also the potential of the cathode of diode 66 and the anode of diode 65. Finally, the plate of diode 66 is connected to ground, or zero volts. It will be seen that on any signals having a positive excursion of greater than 5 volts diode 65 will conduct and thus conduct off the excess more positive than 5 volts. Correspondingly, any signal having a negative excursion in excess of 5 volts will cause diode 66 to conduct and thus conduct off the excess more negative than 5 volts. This is the displacement peak limiter 7 of FIG. 1.

Capacitor 71 bypasses the junction between resistors 67 and 68 to ground and has a large value, as 30 microfarads. At the junction of resistors 69 and 70, however, a peak limited signal appears, and this is conveyed to the grid of cathode follower triode 72 via capacitor 73 and over grid return return resistor 74. The time constant of elements 73—74 is 0.02 second.

The cathode of the first cathode follower 72 is connected to conductor 9 and thus makes available the limited output to the succeeding portions of our device. The cathode resistor is composed of two parts; resistor 75 of a few hundred ohms resistance and resistor 76, connected to ground, of the order of 20,000 ohms resistance.

The second cathode follower 77 is similar to the first one and has input components 78 and 79 and cathode resistors 80 and 81, all having the same values as the corresponding components for cathode follower 72.

The second cathode follower obtains an input signal from the output of amplifier triode 61 via conductor 10. This signal is not limited. Potentiometer 82 allows a balance to be struck with the diode bias that resulted in the limited signal in coaction with fixed resistor 83 connected to ground. The former is of one megohm resistance and the latter two megohms. The output from follower 77 is taken from the cathode via capacitor 84 of one microfarad capacitance, thence to the junction of two diodes 85—86, these connected in opposite polarity and permissibly of the usual germanium semiconductor type. By means of resistors 87 and 88, connected between resistor 67 and ground and having equal resistances of 50,000 ohms each, a potential of plus 5 volts is established at the junction of diodes 85—86. Resistor 89 being also connected to resistor 67 and having a resistance of only a thousand ohms, the cathode of diode 85 is at a plus 10 volt potential. Correspondingly, the anode of diode 86 being connected to ground through resistor 90 of a thousand ohms resistance, has zero potential. Thus, any signal amplitudes in excess of 5 volts positive will cause diode 85 to conduct and amplitudes in excess of 5 volts negative will cause diode 86 to conduct. While these elements have been termed "rectifiers" in FIG. 1 for brevity, they may also be termed rectifier-comparators, or simply comparators.

Either of these excess signal peaks are conveyed to the control grid of pentode 91 via equal 0.02 microfarad capacitors 92 and 93 over grid return resistor 94 of one megohm resistance. The aperiodic cathode circuit of pentode 91 is self-biased by resistor 95 of 4,000 ohms resistance and the screen thereof is provided with a proper operating voltage by voltage divider resistors 96—97, the former connected to the plate voltage supply and having a resistance of one-fourth megohm with the latter connected to the cathode and having a somewhat smaller resistance value. The plate of pentode 91 is connected to a plate resistor 98 of a half megohm resistance and then to the plate voltage supply. It is also connected to the grid of triode 99 through coupling capacitor 100 of 0.02 microfarad capacitance and over grid return resistor 101 of two megohms resistance.

Triode 99 has cathode resistor 102 of a thousand ohms resistance and plate resistor 103 of 50,000 ohms resistance. A voltage divider comprised of resistors 104 and 105 connected from the plate voltage supply to the cathode of triode 99 has a resistance value of 100,000 and 70,000 ohms for the respective parts. At the junction point thereof is connected one plate of neon glow tube 106, while the other plate is connected to the plate of triode 99. The resistance values are chosen so that when there is no signal flowing through the triode there is little or no potential difference across the neon tube. However, should the potential at the plate of the triode decrease because of greater than normal plate current through the triode a potential will exist across the neon tube and it will glow on one plate thereof. If the potential of the triode plate increases because of less than normal plate current through the triode a potential will exist across the neon tube in the opposite direction and a glow will occur on the opposite plate thereof.

Thus, we have provided a sensitive indicator of peak limiting in the displacement signal portion of our device, so that the operator may know when this is occurring. Furthermore, by examining the neon tube the operator may determine whether positive or negative peaks are being clipped off. Such indications and the further bipolarity detail are of more than ordinary significance in this art, where heretofor no such indications have been available.

In order to aid in identification, the rows of circuitry in FIG. 2 essentially match the rows of blocks in FIG. 1. Consequently, we now come to the second row of circuitry and the first differentiation, with means for providing an indication when peak limiting of the velocity signal occurs.

Capacitor 110 and resistor 111 accomplish an imperfect differentiation of substantially the same degree of imperfection or incompleteness as the prior integration. Capacitor 110 has a capacitance of approximately 0.005 microfarad and resistor 111 a resistance of over a half megohm. These values are suitable for frequencies of from a few cycles per second to the order of 50 cycles per second, as are met in the vibration testing art. For higher frequencies either the capacitor or the resistor should be smaller; i.e., the ratio of capacitive reactance to resistance should remain approximately the same.

Switch 112 is provided to eliminate the differentiation for purposes to be described later. Capacitor 113 is for coupling isolation, particularly when switch 112 is on the left hand straight-through contact. The capacitor has a capacitance of 0.1 microfarad and connects from between the junction of differentiator 110—111 to peak limiting resistor 114. The latter has a resistance of over one megohm.

Double diode 115—116 accomplishes velocity peak limiting. The circuit associated with it is quite similar to that associated with displacement peak limiter 65—66 previously described. Resistor 117 performs the same function and has the same value as previous resistor 67. However, resistor 68 has become variable resistor 118, potentiometer 119 and variable resistor 120. The first and last resistors are factory set adjustments and have maximum resistance values of 25,000 and 1,000 ohms, respectively. Potentiometer 119 has an overall resistance of one thousand ohms. This is a front panel control and may be calibrated in velocity, as inches per second, at which peak limiting takes place. Resistors 121 and 122 are of equal value in the megohm range and capacitor 123 is of large bypass value, all as before. The positive and negative peak limiting functioning is exactly as before.

The numerous elements shown from coupling capacitor 124 to neon tube 125 (otherwise unidentified) are the same as to nature, connections and component values as those between coupling capacitor 73 and neon tube 106 in the prior circuitry. A peak-limited velocity signal is therefore obtained at conductor 17 and indication of velocity signal limiting at neon tube 125. All such neon tubes are located on the front panel so that the flashing may easily be observed by the operator.

In a similar manner the elements having to do with acceleration peak limiting and indication are to be found in the lower row of circuitry in FIG. 2, along with two output entities for the device as a whole.

The numerous elements starting with differentiating capacitor 130 and resistor 131 to the acceleration limiting indicating neon tube 133 are the same as to be found in the row of circuitry above, save for the acceleration limiting level control 132, which is of the single variable resistor type having a resistance of 2,500 ohms and being similar to corresponding element 68 in the top row. Resistor 132 is a front panel control and may be calibrated in "g's"; i.e., units of acceleration due to gravity. A range of from zero to 100 g's is feasible.

It is sometimes desirable to operate our device to peak limit acceleration signals only. This is when operating at low acceleration levels and there is little danger of overdisplacement or over-velocity. It is then unnecessary for the operator to adjust for three clipping or limiting levels.

This is accomplished by omitting the integrating and differentiating processes. Each of the four switches, 53, 112, etc., are switched to the straight-through (left-hand) contact so that the capacitors involved, 54, 110, 130, etc., are not in circuit. This may be accomplished by a ganged switch arrangement as a front panel control, or individually. By partial ganging or by individual switch operation it is also possible to limit velocity only, as by retaining capacitors 54 and 130 in circuit. When acceleration only is limited this occurs at the third peak limiter.

Whatever the mode of operation of the forward part of our device, potentiometer 30 allows calibration at reduced vibration and thus without inadvertently overstressing the vibration apparatus or specimen. The several resistors may have the following values: 137, 180,000 ohms; 138, 108,000 ohms; 139, 36,000 ohms; 140, 18,000 ohms; and 141, 18,000 ohms. These give the following outputs; contact 142, full output, the "Operate" position; contact 143, one-half; contact 144, one-fifth; contact 145, one-tenth; and contact 146, one-twentieth.

From whatever resistance value is chosen, switch arm 147 conveys the signal through coupling capacitor 148 and over grid return resistor 149 to the grid of cathode follower connected triode 150. The time constant of elements 148 and 149 is 0.04 second. The plate of triode 150 is connected directly to the plate voltage supply and the cathode to ground through cathode resistor 151 having a resistance of a few thousand ohms. Output capacitor 152 has a capacitance of 20 microfarads and output resistor 153 a resistance of 30,000 ohms. The output signal terminal is 32 and the companion ground or common terminal is 154. The output may be taken by a coaxial conductor, the inner conductor of which connects to terminal 32 and the outer shield to terminal 154.

The circuit of our device now having been described its use will be apparent in various applications. In order to fully disclose our invention, however, the application thereof to vibration testing will be described in detail.

In a typical vibration apparatus our multiple limiter-clipper amplifier is but one in a series of devices comprising; a signal source such as previously discussed, a graphic equalizer for spectrum tilting or shaping according to a desired vibration specification, a band pass filter for limiting the pass band as may be desired, a booster amplifier to overcome the loss in gain occasioned by the other devices, a peak-notch filter to remove sharp resonances from the vibration system, a gain control usually mounted on the operating console, then the multiple limiter-clipper amplifier described herein, a second graphic equalizer to shape the characteristic of the electro-mechanical shaker, then a low pass filter having a top pass frequency of the order of a few thousand cycles to protect the shaker, a power amplifier also having a gain control, the shaker, and the specimen attached to the table thereof. Certain other overload protection devices may also be used but these are not germane to the essential vibrational process.

The procedure for adjusting the multiple limiter-clipper amplifier in relation to the other components of the vibration system in order to act upon a heterogeneous signal is as follows. The displacement amplitude at which peak limiting of displacement is to occur is decided upon according to specifications for the test, the safe amplitude of the shaker, etc. Assume that this is one-half inch. Set the potentiometer switch to contact 145, given one-tenth normal output. This protects the shaker and specimen. Increase the console gain control, utilizing an operating frequency of less than 20 cycles from a single frequency signal source so that displacement will be the controlling factor, until the displacement indicator 106 just flashes. By visual measurement, or by other means, adjust the gain control in the power amplifier until the amplitude of vibration is one-tenth of one-half of one inch; i.e., 0.05". If only displacement limiting is of interest the potentiometer switch arm 147 is now placed upon the "operate" contact 142 and the system displacement will not exceed one-half inch regardless of the signal originated by the signal source.

As has been mentioned, the velocity and acceleration limiting controls are calibrated at the factory, but may also be checked in the field. This is accomplished as follows regardless of where the procedure is carried out. The potentiometer 30 is again set at a fractional value, as one-tenth, at contact 145. A frequency from a single frequency signal source having a frequency where velocity is the dominant parameter, such as 50 cycles, is increased in amplitude until the velocity indicator 125, only, flashes.

A velocity meter is provided on the shaker table, such as a vacuum tube voltmeter connected to a pickup coil of the shaker, from which known velocities may be read. These readings are compared with the engraved calibration marks on the front panel control of velocity limiting 119. If the two do not coincide when the former reading is multiplied by ten, variable resistors 118 and 120 are suitably adjusted to bring this about.

Similarly, as to acceleration limiting, the one-tenth calibration tap (or other convenient ratio) on potentiometer 30 is used and a higher single frequency, such as 200 cycles, is used to drive the system. Only the acceleration indicator 133 should indicate during this test. Using a calibrated accelerometer and multiplying the reading thereof by ten (or the other ratio chosen) the value of acceleration engraved upon the front panel associated with resistor 132 is compared. If these agree, the calibration is correct; if not, the variable resistor 132 is turned mechanically with respect to the panel until agreement is obtained.

After any of these calibration tests the potentiometer 30 is returned to the upper contact 142 for normal calibrated operation.

It might be mentioned that in vibration applications we prefer to attenuate frequencies below 5 cycles per second in our device for enhancing system stability. Accordingly, the stated value of capacitor 136 and the sum of the resistance value of resistors 137 through 141; the value of capacitor 148 and resistor 149; and that of capacitor 152 and resistor 153 are all such that a high pass filter is effected, having a cut-off frequency of the order of 5 cycles.

Certain modifications of our invention are possible. The indicator portions thereof may be eliminated, of course; such as the elements forming the indicating amplifier, from triode 77 to indicator 106, for displacement indication, and the corresponding elements for velocity and acceleration. We do not prefer to make such an elimination, however, because the information given to the operator about the character of any signal at any time is valuable in research and in insuring accurate tests in commercial practice.

For acceleration peak limiting exclusively it will be understood that the entire apparatus is not required. The input amplifier 38—43, the acceleration peak limiting and output indicating sections shown in the bottom row of circuitry in FIG. 2 and comprised of elements 130 to 154 will suffice.

Other modifications are also possible. The values of the many circuit elements stated herein without qualification or as being of a certain order may be varied over a range of two to one either greater or less in nearly every instance without making our device inoperative.

Also, triode vacuum tubes may be replaced by pentode vacuum tubes and vice versa. The germanium diodes may be replaced by other semiconductor or vacuum type diodes. The indicators 106, etc. may be electronic "eye" tuning elements, small cathode ray tubes, and so on.

Vacuum tube heaters have not been shown in FIG. 2 since these are conventional. Also, the plate voltage battery 42 may be replaced by a conventional regulated power supply of equivalent voltage rating a current capability.

Still further modifications in the characteristics of the circuit elements, details of circuit connections and alteration of the coactive relation between the elements may be made without departing from the scope of our invention.

Having this way fully described our invention and the manner in which it is to be practiced, we claim:

1. A circuit for altering components of a heteogeneous signal, said circuit having bi-polarity indicators of alteration of said components comprising means to integrate said composite signal, isolating means, second means to integrate, second isolating means, and limiting means, all said means serially connected; third isolating means, rectifier-comparator means and indicating amplifier means, said latter three means serially connected and said third isolating means connected to said limiting means; differentiating means, second limiting means, fourth isolating means, second rectifier-comparator means and second indicating amplifier means, said latter five means serially connected and said differentiating means connected to said third isolating means; second differentiating means, third limiting means, fifth isolating means, third rectifier-comparator means and third indicating amplifier means, said latter five means serially connected and said second differentiating means connected to said fourth isolating means; each said limiting means removing that amplitude of a component above a predetermined amplitude, and each indicating amplifier means giving an indication when such removal occurs, said indication indicating the polarity of that amplitude removed by the corresponding polarity of current flow through said rectifier-comparator means.

2. Circuit means for altering the components of a composite signal, said circuit means having means to indicate said altering of components comprising means to integrate said composite signal, isolating means, second means to integrate, second isolating means, and limiting means, all said means connected in cascade; third isolating means, comparator means and indicating means, said latter three means connected in cascade and said third isolating means connected to said limiting means; differentiating means, second clipping means, fourth isolating means, second comparator means and second indicating means, said latter five means connected in cascade and said differentiating means connected to said third isolating means; second differentiating means, third limiting means, fifth isolating means, third comparator means and third indicating means, said latter five means connected in cascade and said second differentiating means connected to said fourth isolating means; and potentiometer means connected to said fifth isolating means; each said limiting means eliminating that amplitude of a component in excess of a predetermined amplitude, each indicating means giving an indication when such eliminating occurs, and said potentiometer means allowing calibration of said circuit means at a reduced output level of said composite signal.

3. An electrical circuit for removing excess electrically represented signal amplitudes of a zero order calculus function from an electrically represented signal of a second order calculus function comprising input amplifier means, electrical integrating means, second amplifier means, second integrating means, and zero order limiting means, each of said prior means connected in cascade; zero order amplifier means, zero order rectifier means and zero order indicating means, each of said zero order means connected in cascade and said zero order amplifier means connected to said zero order limiting means; electrical differentiating means connected to said zero order amplifier means, first order limiting means connected to said differentiating means, first order amplifier means, first order rectifier means and first order indicator means, each of said first order means connected in cascade and said first order amplifier means connected to said differentiating means; second differentiating means connected to said first order amplifier means, second order limiting means connected to said second differentiating means, second order amplifier means, second order rectifier means and second order indicator means, each of said second order means connected in cascade and said high order amplifier means connected to said second differentiating means; and output amplifier means connected to said second order amplifier means.

4. An electrical circuit for removing excessive electrically represented displacements from an electrically represented acceleration signal comprising an input amplifier, an imperfect electrical integrator, a second amplifier, a second imperfect integrator, a third amplifier, and a displacement peak limiter, each of said prior elements connected in cascade, a displacement amplifier, a displacement rectifier, and a displacement indicator, each of said displacement elements connected in cascade and said displacement amplifier connected to said displacement peak limiter; an imperfect electrical differentiator connected to said displacement amplifier, a velocity peak limiter connected to said imperfect differentiator, a velocity amplifier, a velocity rectifier, and a velocity indicator, each of said velocity elements connected in cascade and said velocity amplifier connected to said differentiator; a second imperfect differentiator connected to said velocity amplifier, an acceleration peak limiter connected to said second imperfect differentiator, an acceleration amplifier, an acceleration rectifier, and an acceleration indicator, each of said acceleration elements connected in cascade and said acceleration amplifier connected to said second differentiator; an output amplifier connected to said acceleration amplifier; a potentiometer coactively connected to said output amplifier; said displacement peak limiter coactive to remove said excessive displacements, said velocity and said acceleration peak limiters coactive to remove excessive velocity and acceleration components generated by said displacement peak limiter, and said potentiometer allowing adjustment of said circuit at a reduced and safe output level of said electrically represented acceleration signal.

5. Means for limiting electrically represented amplitudes of successively lower orders of calculus functions related to a calculus function of a given order; comprising, successive cascade-connected imperfect integrating means equal in number to the orders of calculus functions to be peak limited, isolating means interposed between each said integrating means, subsequent successive imperfect differentiating means and limiting means alternately connected in cascade, further isolating means interposed between each pair of said alternately connected differentiating and limiting means, said limiting means equal in number to the order of said calculus function of given order, said differentiating and limiting means constituted to reconstitute the calculus function of said given order at a limited amplitude, the first of said differentiating means connected to the last of said integrating means through an additional said limiting means and isolating means, and one indicating means of dual polarity of indication connected to each said limiting means to indicate limiting for that order of said calculus function and the polarity of such limiting.

6. Circuit means for limiting electrically represented amplitudes of plural calculus functions of successive orders down to zero order of a single argument at predetermined levels with respect to the level of the highest of said successive order calculus functions, comprising; successive cascade-connected integrating means equal in number to said successive orders of calculus functions, amplifier means interposed between each said cascade-connected integrating means, independently adjustable limiting means and successive differentiating means alternately cascade-connected and equal in number to the orders of calculus functions, amplifier means also interposed between each said limiting means and the succeeding said cascade-connected differentiating means, said limiting means and said differentiating means coactive to reconstitute said highest order of calculus function at limited amplitude of all orders of calculus functions processed, the first of said limiting means connected to the last of said integrating means through a said interposed amplifier means, and indicating means equal in number to the orders of said calculus functions, one said indicating means connected to each said limiting means for indicating when limiting occurs for that order of function.

7. Circuit means for removing excessive peak electrically represented signal amplitudes of plural successive order calculus functions down to zero order from the highest order of said electrically represented successive calculus functions and for similarly limiting amplitudes of said highest order calculus function comprising successive cascade connected integrators equal in number to the orders of said successive order calculus functions, isolating means between said integrators, subsequent successive differentiators and peak limiters also cascade connected, isolating means between said peak limiters and said differentiators, said peak limiters equal in number to the orders of said successive calculus functions, said differentiators and said limiters coactive to re-form said highest order calculus function devoid of said excessive electrically represented signal amplitudes, the first of said differentiators connected to the last of said integrators through an additional isolating means, and polarity-sensitive indicators equal in number to the orders of said successive order calculus functions down to said zero order, one said indicator connected to each said peak limiter for automatically indicating whether limiting occurs for that order of function and of what polarity.

8. Circuit means for removing excessive electrically represented signal amplitudes of a zero order calculus function from an electrically represented signal of a one higher order calculus function of the same argument comprising electrical integrating means, isolating amplifier means and limiter means, the prior means connected in the order mentioned, zero order amplifier means connected to said limiter means; electrical differentiating means connected to said zero order amplifier means, a higher order calculus function limiter means connected to said differentiating means; said limiter means coactive with said integrating means to remove said excessive zero order signal amplitudes, and said higher order limiter means coactive with said differentiating means to remove spurious signal components including those generated by said zero order limiter means.

9. Circuit means for removing excessive peak electrically represented signal amplitudes of a first order calculus function from an electrically represented signal of a second order calculus function of the same argument, said circuit means having indicator means for indicating when such removal occurs, comprising; electrical signal imperfect integrating means, isolating amplifier means, and peak limiting means, each of said prior means connected in cascade; first order amplifier means, first order rectifier means, and first order indicator means, each of said first order means connected in cascade and said first order amplifier means connected to said peak limiting means; electrical imperfect differentiating means connected to said first order amplifier means, further peak limiting means connected to said differentiating means; further amplifier means, further rectifier means, and further indicator means, said further means connected in cascade and said further amplifier means also connected to said electrical differentiating means; said peak limiting means coactive with said integrating means to remove said excessive first order signal amplitudes, said further peak limiting means coactive with said differentiating means to remove components of excessive amplitude generated by said first order peak limiting; each said indicator means coactive with the respective rectifier means to indicate when the respective signal amplitude exceeds the biases of the respective peak limiting means as compared in the respective rectifier means.

10. In an electrical circuit for removing excessive electrical amplitudes from an electrical signal of a second order calculus function, said circuit having plural integrating means and plural isolating means alternately cascade-connected for reducing the order of said function to zero order and plural differentiating means plural limiting means, and plural isolating means successively cascade-connected for subsequently increasing the order of said function to the second order, coactive limiting-indicating-calibrating elements comprising; isolating means, rectifier-comparator means and indicating-amplifier means, said three means serially connected with said isolating means connected to a said limiting means and said indicating-amplifier means constituted to automatically indicate either positive or negative values of said amplitudes; calibrated potentiometer means and output amplifier means, said latter two means serially connected and said calibrated potentiometer means connected to said isolating means; said limiting means removing that amplitude of said component above a predetermined amplitude, said indicating-amplifier means giving an indication when such removal occurs, said indication indicating the polarity of that amplitude removed by the corresponding polarity of current flow through said rectifier-comparator means, and said calibrated potentiometer means allowing adjustment of said circuit means at a reduced level of said electrical signal.

References Cited in the file of this patent
UNITED STATES PATENTS

| | | |
|---|---|---|
| 2,251,973 | Beale et al. | Aug. 12, 1941 |
| 2,506,770 | Braden | May 9, 1950 |
| 2,511,564 | Callan | June 13, 1950 |
| 2,845,533 | Wolcott | July 29, 1958 |
| 2,849,181 | Lehmann | Aug. 26, 1958 |
| 2,882,522 | Pearlman | Apr. 14, 1959 |

OTHER REFERENCES

Publication I: "A New Portable Telegraph Transmission Measuring Set" by S. I. Cory, AIEE Technical Paper No. 54-105, pp. 1-7, February 1954.